March 4, 1930.  C. L. PELTON  1,749,504
AERIAL DISTRIBUTION OF MATERIALS
Filed Dec. 15, 1924
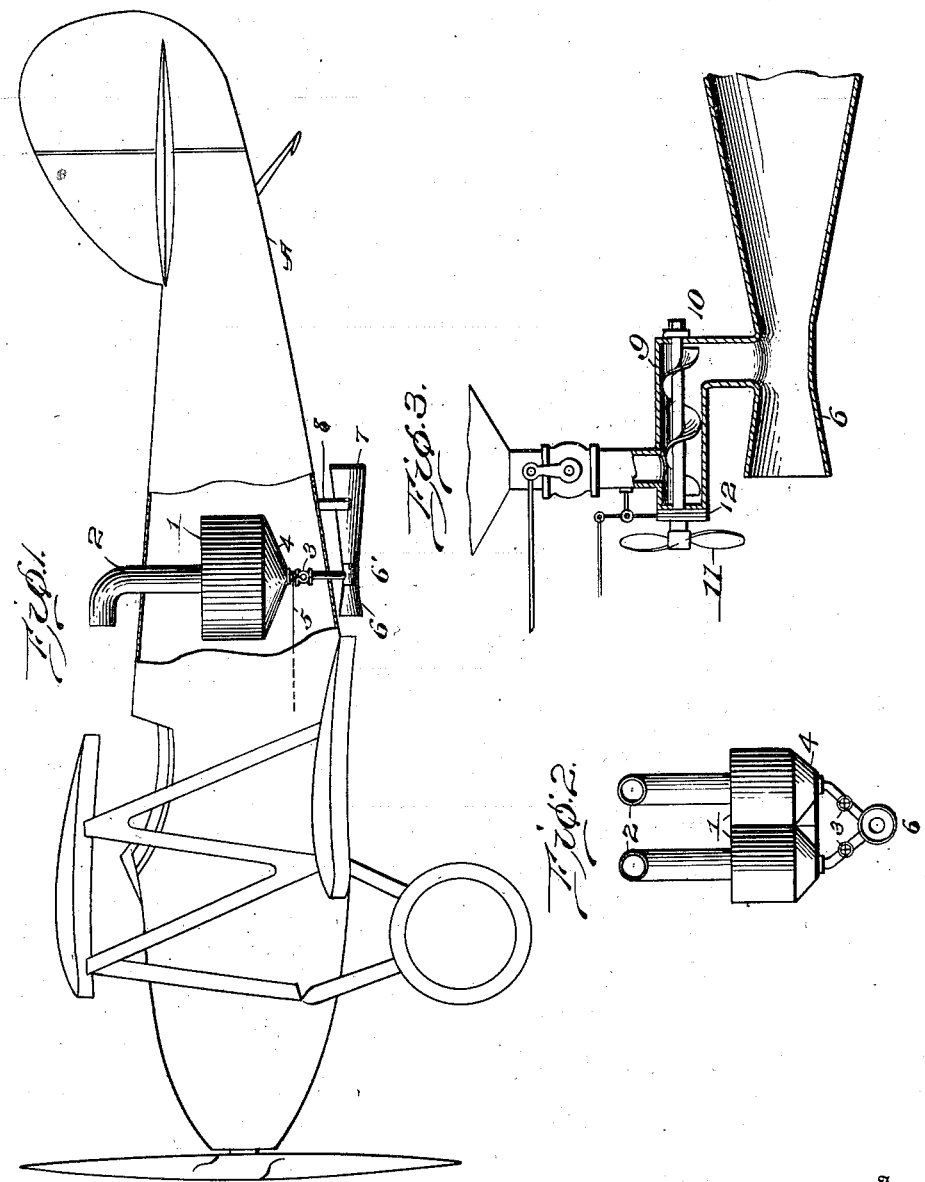
Inventor
Clifford L. Pelton
By Robert H. Young
Attorney Patented Mar. 4, 1930

1,749,504

UNITED STATES PATENT OFFICE

CLIFFORD L. PELTON, OF NORRISTOWN, PENNSYLVANIA

AERIAL DISTRIBUTION OF MATERIALS

Application filed December 15, 1924. Serial No. 755,969.

This invention relates to the discharge and distribution of certain substances, either in the form of a finely divided solid, a liquid, or gas into the atmosphere. More particularly, my invention relates to a device which can be used on an airplane for such a distribution.

The use of the airplane has been greatly extended in this field of activity. Not only is the airplane useful in war purposes for covering wide areas with poisonous gases, or for laying down smoke screens, but it has been used for commercial and agricultural purposes as well. An example is "sky-writing" advertising, that is, maneuvering an airplane and controlling a visible trail of smoke during flight so that winds, signs, etc. are made visible in the air to persons on the ground. Another example is that of distributing a liquid or powder over tree and plant life of any kind for the purpose of protecting the plants or trees from the attacks of insects and fungi.

This invention has for its object the provision of a device which will positively withdraw material from a container placed in some part of an airplane and produce a more uniform cloud of smoke, gas, etc. than heretofore obtained. To this end a discharge pipe of Venturi shape is utilized, the action of which is two-fold, first, to remove material from the container by suction into the throat of the discharge pipe and second, to atomize and mix the material by and with the blast passing through the tube.

Another object of this invention is to provide a device which will draw material from two or more containers and by its action effectively mix the materials in discharging them into the atmosphere. Such a mixture, for example, is desirable in combining two chemicals to produce a dense smoke screen and this result is obtained by using my device with two or more receptacles.

It is a further object of this invention to provide a means for producing a uniform distribution. By utilizing a discharge pipe, such as I contemplate, the amount of material discharged is proportional to the speed of the airplane. If it is desired to spread a poisonous gas or a disinfectant of a certain concentration over a certain area, this is accomplished by selecting the proper proportions of the discharge pipe. The speed of the airplane does not enter to alter the concentration appreciably. In other words, the faster the airplane moves, the greater the suction action of the Venturi discharge pipe will be. In addition, this invention contemplates a positively driven feeding device, such as an air propelled screw feed, to accomplish the above object.

It is also an object of this invention to provide a device which not only has a function to discharge a material positively and uniformly into the atmosphere but also to provide a means to control that discharge in quantity as well. Therefore, a device under control of the operator is provided to control the opening into the discharge pipe.

With these and other objects in view, such that are incidental thereto and hereinafter appear, a particular embodiment of my invention will now be described and illustrated in the accompanying drawing, in which Fig. 1 is a diagrammatical elevation of an airplane equipped with means for carrying out my invention.

Fig. 2 is an end view of my device.

Fig. 3 is a cross sectional view of a modification, showing an air propelled screw feed and discharge pipe.

Referring more particularly to the drawings, a container 1 is mounted on the fuselage of an airplane. The vent 2 is provided not only as a filling pipe but also to exert a pressure on the contents in the container, particularly if the material used is a powder. In case of a liquid, the filling hole can be provided with a plug having a small vent instead. The bottom of the container is sloped down to an outlet which opens into the pipe 3. A valve 4 of any well-known type, for example, a butterfly valve, is located in pipe 3 and is controlled by the pilot through a rod connection 5.

The pipe 3 opens into the discharge pipe 6, which has a Venturi shape at its restricted throat portion 6′. The size of the throat and the length and flare of the trailing portion 7 depends upon the quantity of material that is desired to be distributed per unit area. The pipe 3 and strap 8 serves to support the discharge pipe to the fuselage.

As shown in Fig 2, two containers may be used, each having a pipe leading to the throat of the discharge pipe. By such an arrangement, the materials from each container are sucked into the throat of the discharge pipe and then intimately mixed or atomized before being discharged out into the atmosphere.

Instead of using the valve 4 in the pipe 3, I have shown in the modification in Fig. 3, a device which not only operates as a valve but also positively feeds material into the discharge pipe. A housing 9 which contains a feeding screw 10 is inserted in pipe 3. This screw is driven by the propeller 11 and a clutch mechanism, indicated at 12, is used to control the turning of the screw 10. The clutch 12 is preferably one of the multiple disk type although any type may be used and for that reason, the particular structure of the clutch is not illustrated. By such a structure, the control and feed of heavy solid materials like fertilizers, can be distributed more readily without clogging. When the clutch 12 is disengaged, the screw 10 closes the pipe 3 and no material is fed. During flight the air propeller 11 is free to turn and by engaging the clutch 12, the feeding screw turns to feed material to the throat of the discharge pipe. The faster the speed the airplane travels, the air propeller will be also driven at a faster rate, thus causing the material to be fed and discharged in proportionally greater amounts. A certain amount of slip between the driven and driving elements of the clutch allows the propeller to gradually take on the burden of turning the feeding screw.

Having thus described my invention, I claim:—

1. In a flying machine, a receptacle for pulverulent material, an air impelled mechanical means for distributing such material mounted below said receptacle and a connection between said receptacle and said distributing means.

2. In a flying machine, a receptacle for pulverulent material, an air impelled mechanical means for distributing such material mounted below said receptacle, a connection between said receptacle and said distributing means, and a discharge pipe in communication with said distributing means.

In testimony whereof I affix my signature.

CLIFFORD L. PELTON.